United States Patent

[11] 3,598,992

[72] Inventor Joseph Edwin Bridge, Jr.
  Reading, Pa.
[21] Appl. No. 789,755
[22] Filed Jan. 8, 1969
[45] Patented Aug. 10, 1971
[73] Assignee Carpenter Technology Corporation
  Reading, Pa.

[54] DIFFRACTOMETER WITH AUTOMATIC SAMPLE CHANGER
1 Claim, 4 Drawing Figs.

[52] U.S. Cl. .................................................. 250/51,
  250/51.5
[51] Int. Cl. ........................................ H01j 37/20,
  G01n 23/20

[50] Field of Search .......................................... 250/51.5,
  41.92

[56] References Cited
UNITED STATES PATENTS
2,540,821 2/1951 Harker .................... 250/51.5
3,263,078 7/1966 Thackara et al. ............. 250/51.5

Primary Examiner—James W. Lawrence
Assistant Examiner—C. E. Church
Attorney—Edgar N. Jay ABSTRACT: A diffractometer with automatic sample-changing means which is actuated to change the sample to be exposed to the X-ray beam upon completion of each excursion through its range of values of the angle made by the incident beam to the surface irradiated.

DIFFRACTOMETER WITH AUTOMATIC SAMPLE CHANGER

This invention relates to a diffractometer and, more particularly, to a diffractometer having means responsive to rotation of the diffractometer head through the desired angle for automatically changing the sample carried by the head and to be exposed to the X-ray beam.

It is often necessary for metallurgists to carry out X-ray diffraction measurements in the course of which, while the sample is being irradiated, the angle of incidence thereon of the X-ray beam must be rotated through a relatively wide angle at a slow rate. For example, in carrying out measurements for making a quantitative estimate of the percent austenite in a sample of steel, the angle of incidence of the X-ray beam to the surface of the sample undergoing test is shifted through an angle of about 60° at a rate of about 0.4° per minute. Thus, each such measurement takes about 2 ½ hours. All diffractometers hitherto available with which I am familiar require that the sample which has undergone irradiation be manually replaced with a fresh sample and, when that has been done, the apparatus must be restarted. Consequently, during a normal 8-hour working day, only three or, at most, four such austenite samples could be mounted for irradiation while unattended.

Other types of measurements are carried out with a much smaller angle through which the sample is scanned by the X-ray beam. And though carried out at a slower rate, about 0.1° per minute, such measurements require considerably less time, about 10 minutes, for each sample. In that case, the instrument requires substantially constant attendance for efficient operation.

In accordance with my invention, I provide an improved diffractometer having means for automatically changing the sample to be irradiated and for automatically reversing the direction of rotation of the diffractometer head. The arrangement is such that each succeeding sample is automatically accurately positioned and supported for irradiation by the X-ray beam while the angle of incidence of the X-ray beam on the surface of the sample is varied through the required range. The maximum number of samples the automatic sample changing means is adapted to hold can be varied as desired, but preferably its capacity is such that at least in the case of the measurements requiring the longer periods of time somewhat more than 24 hours of continuous, uninterrupted operation can be had.

Further objects as well as advantages of the present invention will be apparent from the following detailed description of a preferred embodiment thereof and the accompanying drawings in which FIG. 1 is a diagrammatic view partially in perspective and broken away for convenience showing a preferred embodiment of the present invention;

Figure 1:
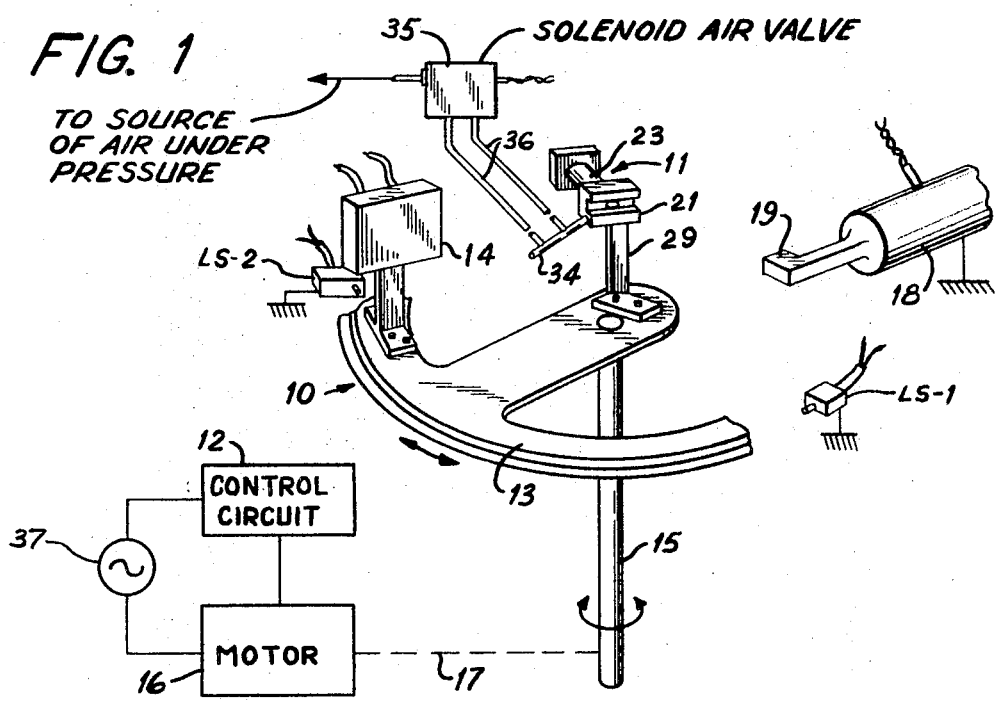

Referring now to FIG. 1 of the drawings, X-ray diffractometer 10 is of conventional construction except for its automatic sample changer 11 and control circuit 12, both of which will be described in detail hereinbelow. Diffractometer 10 comprises a rotatably mounted head 13 on which there is fixed in predetermined, spaced relationship to each other a detector 14 and the automatic sample changer 11. The head 13 is connected to a shaft 15 for rotation thereby when the latter is driven clockwise or counterclockwise about its vertical axis by a motor 16. The motor 16 is connected to the shaft 15, as indicated diagrammatically at 17, by means of suitable reduction gears which are not shown in the drawing. An X-ray source is mounted within a housing 18 fixed on a base (not shown) which conveniently also serves to support the head 13 and shaft 15, and to enclose motor 16. The X-rays pass through a collimator 19 to each sample supported in a holder 21 of the automatic sample changer 11. The rotation of the head 13 is imparted to the sample so that the angle the surface of the sample makes with the incident X-ray beam from the collimator 19 is varied at a rate determined by the speed of motor 16. The X-ray beam diffracted by the sample is collected by the detector 14 which is coupled in the usual way to a strip chart (not shown) driven in synchronism with the head 13. As is well known, the sample and the detector 14 are not rotated at the same rate, means (not shown) being provided for rotating the detector 14 at twice the rate at which the sample and changer are rotated.

Because the construction and arrangement of the various parts of the diffractometer 10, except for the automatic sample changer 11 and control circuit are well known in the art and the details thereof form no part of the present invention, no further description thereof here is believed to be necessary.

Figure 2:
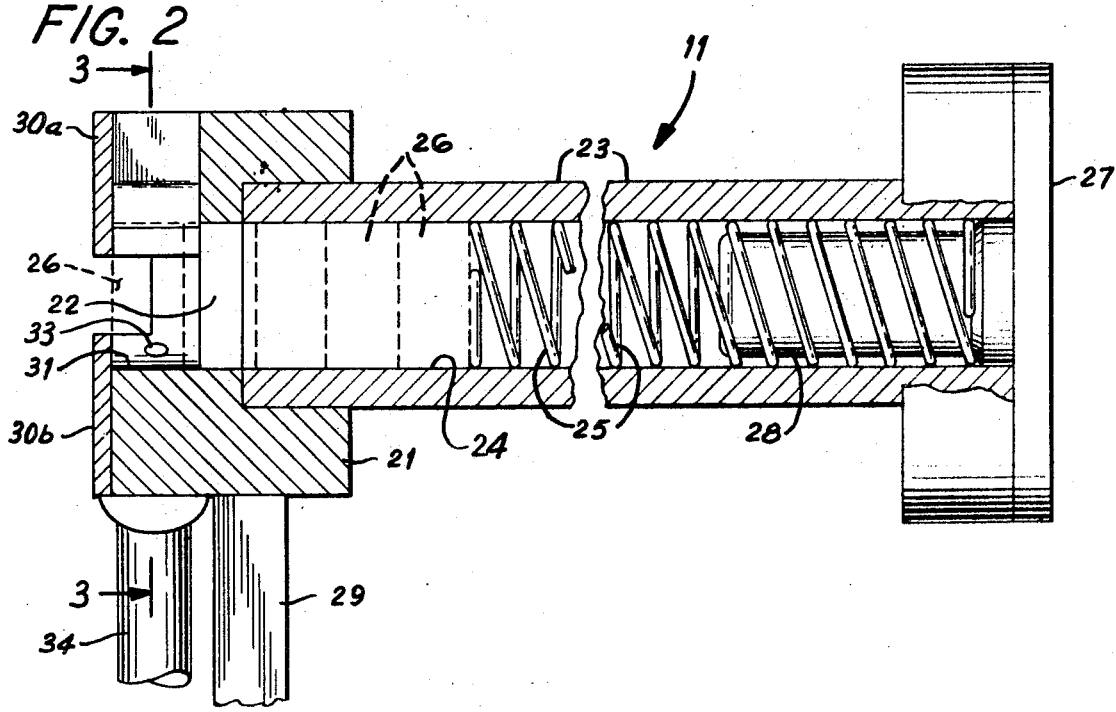
FIG. 2 is a longitudinal cross-sectional view taken through the line 2-2 of FIG. 3 and showing the means for holding, feeding and ejecting the samples.
Figure 3:
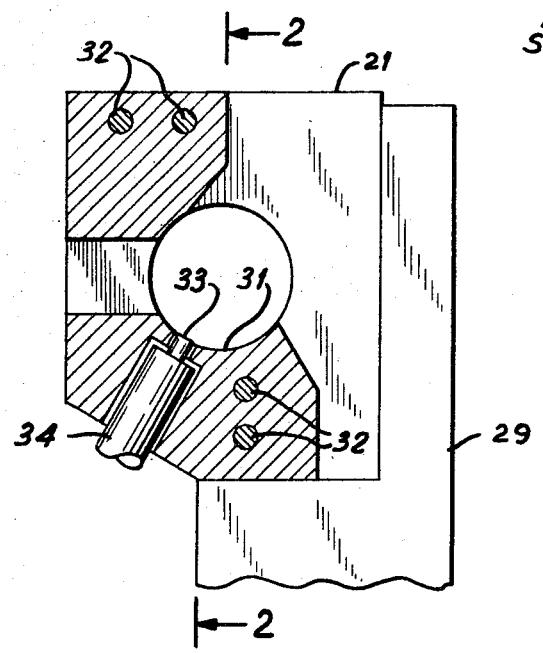
FIG. 3 is a cross-sectional view taken through the line 3-3 of FIG. 2.

Turning now to FIGS. 2 and 3, automatic sample changer 11 comprises means for holding and accurately positioning each sample to be irradiated which include sample holder 21 having a passageway 22 formed therein. A tubular horizontally extending magazine 23 has an elongated chamber 24 which communicates with passageway 22 and in which a coil spring 25 functions to urge samples 26 to the left as viewed in FIGS. 2. A cover plate 27 is removably secured to the magazine 23 in any convenient way and carries spring guide 28 which extends within the magazine 23 with more or less of the spring 25 coiled thereon depending on the number of samples in the magazine.

Sample holder 21 is connected to an arm 29 which is in turn connected to head 13 so that the former is maintained in fixed relation thereto and in predetermined relation to the detector 14. On the side of the sample holder 21 away from the magazine 23, there are mounted by means of screws 32 two locating members 30a and 30b which coact with a sample seat 31 to locate and accurately position each sample so that the vertical centerline of its surface presented to the X-ray source is aligned with the axis of shaft 15. In the present instance, the samples 26 are each circular, and the seat 31 formed in the sample holder 21 has a curvature complementary to somewhat less than 180° of the periphery of the circular samples.

As shown most clearly in FIGS. 2 and 3, a piston 33 is positioned in a transverse bore formed in the sample holder 21 and communicates with the passageway 22 through the seat 31. The piston 33 is part of a conventional air cylinder 34 which is operated by means of air under pressure. As indicated diagrammatically in FIG. 1, air cylinder 34 is connected adjacent its opposite ends by means of conduits 36 to solenoid air valve 35 which is in turn connected to a source of air under pressure. As is well known, when the solenoid air valve 35 is operated to admit air under pressure to the lower left end of air cylinder 34, the piston 33 is shifted upward to eject a sample 26 positioned on the seat 31. As each sample 26 ejected from the seat 31, clears the passageway 22 the spring 25 urges the remaining samples in the magazine and holder forward so as to position the next sample on the seat 31.

Figure 4:
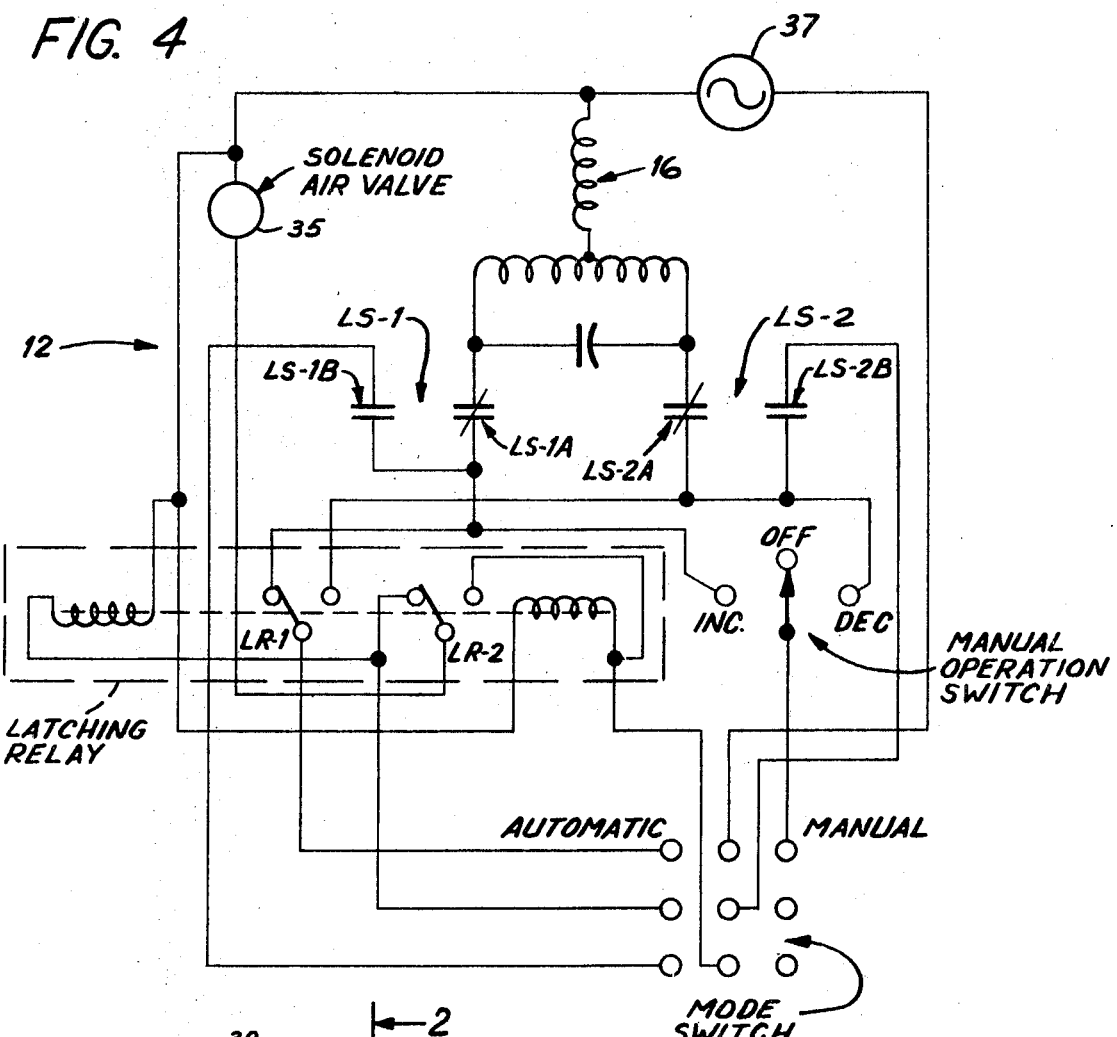
FIG. 4 is a schematic diagrammatic view of the control circuit for the diffractometer head and the sample feed means.

As shown in FIG. 1, a pair of single pole, double throw limit switches LS-1 and LS-2 are each mounted at the opposite ends of the permissible extreme rotation of the head 13. Limit switch LS-1 has a normally closed contact LS-1A and a normally open contact LS-1B. Limit switch LS-2 has corresponding contacts LS-2A and 2B (FIG. 4). The limit switches LS-1 and LS-2 are mounted to be operated by the advancing end of the head 13 or, if desired, switch actuators (not shown) mounted thereon.

When it is desired to place the diffractometer 10 into continuous automatic operation, the magazine 23 and sample holder 21 are filled with samples, and the cover plate 27 is secured in place on the magazine 23 compressing spring 25. Thus, the first sample is firmly positioned against the locating surfaces of the locating members 30a and 30b with the surface to be irradiated presented to the X-ray source through the space between the two locating members. Assuming that member 13 is in the position in which its left-hand end has completed actuating limit switch LS-2 and the head 13 is ready to be rotated counterclockwise to increase the angle of incidence of the X-ray beam, the coils of the latching relay and the solenoid air valve will be deenergized, and the contacts will be positioned as shown in FIG. 4. It is apparent that motor 16 is energized through the normally closed contacts LS-1A of limit switch LS-1, the armature of latching relay contacts LR-1 in the left-hand position, and through the top contacts of the mode switch. It is to be noted that the latching relay is of the type which retains its contacts in the position to which one coil has shifted them, even though both coils are then deenergized, until the other coil of the relay is energized. It is also to be noted that the latching relay contacts LR-1 and LR-2 are make-before-break contacts.

Motor 16 continues in operation to rotate head 13 counterclockwise until it engages limit switch LS-1 opening contacts LS-1A to interrupt the circuit to motor 16 and close contacts LS-1B. Closing of contacts LS-1B energizes the right-hand or decrease coil of the latching relay which shifts the armatures of contacts LR-1 and LR-2 to their right-hand positions to close the circuit for reversing motor 16 through the normally closed contacts LS-2A. Because of the make-before-break action of the latching relay contacts, the solenoid air valve 35 is momentarily energized through a circuit extending from the valve 35 through contacts LR-2, the bottom contacts of the mode switch, now closed contacts LS-1B, the still closed contacts LR-1, the top contacts of the mode switch, and to the opposite side of the power supply 37.

Momentary operation of the solenoid air valve 35 results in air under pressure being admitted to the cylinder 34 to actuate piston 33 to eject the sample 26 which had been irradiated. And spring 25 advances the samples in the magazine to position a fresh one on the seat 31 in the holder 21.

Energization of motor 16 through the contact LS-2A causes it to rotate the head 13 clockwise in the sense to reduce the angle the X-ray beam makes with the surface of the sample 26. At the end of its arc, the head 13 actuates limit switch LS-2 to open contacts LS-2A and close contacts LS-2B. This serves to interrupt the circuit to the motor 16 and to energize the left-hand coil of the latching relay. The latter shifts its armatures to the left, thereby closing a circuit to motor 16 which reverses it and at the same time again energizes the solenoid air valve 35 momentarily to actuate the sample changer. As soon as the motor 16 is reenergized to shift the head 13 away from the limit switch LS-2, the circuit is restored to the condition shown in FIG. 4.

When for any reason, manual operation of the system is desired, the mode switch is shifted to the right and the manual operation switch is used to control the operation of the diffractometer, the head 13 being rotated counterclockwise when the manual operation switch is shifted to its increase position indicated by the legend "Inc." (FIG. 4) and clockwise when that switch is shifted to its decrease position indicated by the legend "Dec." The limit switches now function in the usual way to interrupt operation of the motor 16, but reenergization must be manually initiated.

It is to be noted that air cylinder 34 and piston 33 are connected to the sample holder 21 so that in its rotation with the sample holder 21 it is unobstructed by other members which in practice may be positioned close to the sample holder, e.g. about 2 to 3 inches. Preferably, the air cylinder is mounted as shown in FIG. 3 at an angle of about 60° to the horizontal to reduce the amount of clearance required.

The present invention has been described in detail with reference to a preferred embodiment thereof. Such details as the means for varying the speed of motor 16, interlocking of the X-ray source with the operation of head 13, and others have been omitted because they are not part of the present invention.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed.

I claim:

1. In a diffractometer having a rotatably mounted head and motor means for rotating said head in either of two opposite directions about a vertical axis whereby to vary the angle of diffraction by an irradiated sample of X-rays received at a detector from a source thereof, sample holder means and means supporting the same substantially in alignment with said axis, said sample holder means forming a seat and including a pair of spaced locating members each having a surface extending substantially vertically in the same plane as a surface of the other and substantially aligned with said vertical axis of rotation, said sample holder means having a bore formed therein communicating with said seat, ejector means for ejecting a sample from said seat and including a piston mounted in said bore and movable between two positions one in which it is retracted within said bore and the other in which it projects from said bore to eject a sample from said seat, a substantially horizontally extending tubular magazine connected to said sample holder means with its interior communicating with said seat, resilient means extending in said magazine for urging a sample onto said seat and against said surfaces, and control means responsive to the arrival of said head in each of its extreme positions for reversing said motor means and for actuating said ejector means to eject a sample from said seat.